US012693786B2

(12) United States Patent
de Vries et al.

(10) Patent No.: US 12,693,786 B2
(45) Date of Patent: *Jul. 28, 2026

(54) SYSTEMS, METHODS, AND MEDIA FOR RECOVERING WORKER SHARES FROM READ PRIORITIZATION

(71) Applicant: SK hynix NAND Product Solutions Corp., Rancho Cordova, CA (US)

(72) Inventors: Jonathan de Vries, Folsom, CA (US); Neelesh Vemula, Santa Clara, CA (US)

(73) Assignee: SK hynix NAND Product Solutions Corp., Rancho Cordova, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/961,080

(22) Filed: Nov. 26, 2024

(65) Prior Publication Data

US 2025/0094056 A1      Mar. 20, 2025

Related U.S. Application Data

(63) Continuation of application No. 17/949,378, filed on Sep. 21, 2022, now Pat. No. 12,182,410.

(51) Int. Cl.
G06F 3/06 (2006.01)

(52) U.S. Cl.
CPC .......... G06F 3/0613 (2013.01); G06F 3/0653 (2013.01); G06F 3/0679 (2013.01)

(58) Field of Classification Search
None
See application file for complete search history.

(56) References Cited

U.S. PATENT DOCUMENTS

| | | | |
|---|---|---|---|
| 7,555,621 | B1 | 6/2009 | Pavlyushchik |
| 9,213,637 | B1 | 12/2015 | Karamcheti et al. |
| 10,860,388 | B1 | 12/2020 | Ozturk |

(Continued)

FOREIGN PATENT DOCUMENTS

| | | |
|---|---|---|
| CN | 111124253 A | 5/2020 |
| CN | 112416556 A | 2/2021 |
| JP | 2014-013587 | 1/2014 |

OTHER PUBLICATIONS

International Preliminary Report on Patentability dated Apr. 3, 2025 in International Patent Application No. PCT/US2023/033396, pp. 1-5.

(Continued)

*Primary Examiner* — Yaima Rigol
(74) *Attorney, Agent, or Firm* — Byrne Poh LLP

(57) ABSTRACT

Recovering worker shares from read prioritization including: while read accesses (RA) to a storage device (SD) are being prioritized over write accesses (WA) to the SD: determining a first count of RA to the SD; performing a first adjusting of a base read share percentage (RSP) to a first adjusted RSP for RA to the SD based on the first count of RA; and controlling read access to the SD based on the first adjusting; determining that RA to the SD have completed being prioritized over WA to the SD; and after RA to the SD have completed being prioritized: determining a second count of WA to the SD; performing a second adjusting of the first adjusted RSP to a second adjusted RSP for RA to the SD based on the second count of WA; and controlling write access to the SD based on the second adjusting.

15 Claims, 4 Drawing Sheets

(56) References Cited

U.S. PATENT DOCUMENTS

| | | | |
|---|---|---|---|
| 11,314,436 B1 | 4/2022 | Gahlot et al. | |
| 2003/0023815 A1 | 1/2003 | Yoneyama et al. | |
| 2003/0167385 A1 | 9/2003 | Lai et al. | |
| 2004/0179479 A1 | 9/2004 | Thibodeau et al. | |
| 2010/0180006 A1 | 7/2010 | Nourbakhsh et al. | |
| 2013/0282962 A1 | 10/2013 | Rub et al. | |
| 2014/0281260 A1 | 9/2014 | Peterson et al. | |
| 2014/0325164 A1 | 10/2014 | Thompson et al. | |
| 2016/0187959 A1 | 6/2016 | Nagarajan et al. | |
| 2016/0224255 A1* | 8/2016 | Park | G06F 3/0679 |
| 2017/0358346 A1 | 12/2017 | Zhang et al. | |
| 2018/0232178 A1 | 8/2018 | Iwaki et al. | |
| 2018/0260251 A1 | 9/2018 | Beveridge et al. | |
| 2020/0133585 A1 | 4/2020 | Muchheria et al. | |
| 2021/0042233 A1 | 2/2021 | Lee et al. | |
| 2021/0303340 A1 | 9/2021 | Li et al. | |
| 2022/0189561 A1 | 6/2022 | Kamata et al. | |
| 2022/0222013 A1 | 7/2022 | Shveidel et al. | |
| 2022/0246187 A1 | 8/2022 | Shiraishi | |
| 2022/0270655 A1 | 8/2022 | Ochiai | |
| 2023/0062167 A1 | 3/2023 | Agarwal et al. | |
| 2023/0229590 A1 | 7/2023 | Bi | |
| 2023/0236758 A1 | 7/2023 | Gatto | |

OTHER PUBLICATIONS

International Preliminary Report on Patentability dated May 15, 2025 in International Patent Application No. PCT/US2023/035862, pp. 1-6.

International Search Report and Written Opinion dated Jan. 22, 2024 in International Patent Application No. PCT/US2023/033396, pp. 1-8.

International Search Report and Written Opinion dated Feb. 19, 2024 in International Patent Application No. PCT/US2023/035862, pp. 1-9.

Notice of Allowance dated Mar. 5, 2025 in U.S. Appl. No. 17/977,975, pp. 1-63.

Notice of Allowance dated Aug. 21, 2024 in U.S. Appl. No. 17/949,378, pp. 1-25.

Office Action dated Feb. 22, 2024 in U.S. Appl. No. 17/949,378, pp. 1-22.

Office Action dated Mar. 14, 2024 in U.S. Appl. No. 17/977,975, pp. 1-75.

Office Action dated Oct. 11, 2024 in U.S. Appl. No. 17/977,975, pp. 1-80.

Office Action dated Nov. 10, 2025 in CN Patent Application No. 202380067943.3, pp. 1-8.

Office Action dated May 5, 2026 in U.S. Appl. No. 19/173,293, pp. 1-61.

* cited by examiner

SYSTEMS, METHODS, AND MEDIA FOR RECOVERING WORKER SHARES FROM READ PRIORITIZATION

CROSS-REFERENCE TO RELATED APPLICATION

This application claims the benefit of U.S. patent application Ser. No. 17/949,378, filed Sep. 21, 2022, which is hereby incorporated by reference herein in its entirety.

BACKGROUND

Modern computing devices, which can include general and special purpose computers such as desktop computers, laptop computers, tablet computers, servers, mobile phones, Internet of Things (IoT) devices, among many others, frequently implement different processes (which can be referred to herein as "workers") that read and/or write information (which can include data and/or programs) to and/or from one or more storage devices, such as solid-state drives. In order to ensure that each worker receives a desired amount of access to the storage device(s), such modern computing devices can allocate a share to each worker that defines the amount of access each worker has to the storage device(s), or a portion thereof. For example, a share amount can indicate a percentage of time that a worker is to have access to a storage device, or a portion of the storage device. As a more particular example, for a computing device with three workers, worker 1 could be allocated a share of 50% (or any other suitable percentage between 0% and 100%), worker 2 could be allocated a share of 30% (or any other suitable percentage between 0% and 100%), and worker 3 could be allocated a share of 20% (or any other suitable percentage between 0% and 100%). In this scenario, on average, over long periods of time, worker 1 would be able to access the storage device, or a portion thereof, for approximately 50% of the total time the storage is accessed, and workers 2 and 3 would similarly have access times approximately equal to 30% and 20%, respectively.

In some instances, in order to meet quality of service (QoS) requirements, a storage device may prioritize read accesses (which tend to be shorter in time) to the storage device over write accesses (which tend to be longer in time) to the storage device. While this prioritization can improve the performance of the storage device, it can also cause the shares realized by different workers to not match their allocated shares.

Accordingly, new mechanism for recovering worker shares from read prioritization are desirable.

SUMMARY

In accordance with some embodiments, mechanisms (which can include systems, methods, and media) for recovering worker shares from read prioritization are provided.

In some embodiments, systems for recovering worker shares from read prioritization are provided, the systems comprising: memory; and at least one hardware processor collectively configured to at least: determine that read accesses to a storage device are being prioritized over write accesses to the storage device; while read accesses to the storage device are being prioritized over write accesses to the storage device: determine a first count of read accesses to the storage device; perform a first adjusting of at least one of: (i) a base read share percentage to a first adjusted read share percentage for read accesses to the storage device based on the first count of read accesses; or (ii) a base write share percentage to a first adjusted write share percentage for write accesses to the storage device based on the first count of read accesses; and control read access to the storage device based on the first adjusting; determine that read accesses to the storage device have completed being prioritized over write accesses to the storage device; and after read accesses to the storage device have completed being prioritized over write accesses to the storage device: determine a second count of write accesses to the storage device; perform a second adjusting of at least one of: (i) the first adjusted read share percentage to a second adjusted read share percentage for read accesses to the storage device based on the second count of write accesses; or (ii) the first adjusted write share percentage to a second adjusted write share percentage for write accesses to the storage device based on the second count of write accesses; and control write access to the storage device based on the second adjusting. In some of these embodiments, the first adjusting of the at least one of: (i) the base read share percentage to the first adjusted read share percentage for read accesses to the storage device based on the first count of read accesses; or (ii) the base write share percentage to the first adjusted write share percentage for write accesses to the storage device based on the first count of read accesses, comprises at least one of: (i) adjusting the base read share percentage to the first adjusted read share percentage for read accesses to the storage device based on a control parameter raised to the power of the first count of read accesses; or (ii) adjusting the base write share percentage to the first adjusted write share percentage for write accesses to the storage device based on the control parameter raised to the power of the first count of read accesses. In some of these embodiments, the second adjusting of the at least one of: (i) the first adjusted read share percentage to the second adjusted read share percentage for read accesses to the storage device based on the second count of write accesses; or (ii) the first adjusted write share percentage to the second adjusted write share percentage for write accesses to the storage device based on the second count of write accesses, comprises at least one of: (i) adjusting the first adjusted read share percentage to the second adjusted read share percentage for read accesses to the storage device based on a control parameter raised to a product of a scaling factor and the second count of write accesses; or (ii) adjusting the first adjusted write share percentage to the second adjusted write share percentage for write accesses to the storage device based on the control parameter raised to the product of the scaling factor and the second count of write accesses. In some of these embodiments, the second adjusting of the at least one of: (i) the first adjusted read share percentage to the second adjusted read share percentage for read accesses to the storage device based on the second count of write accesses; or (ii) the first adjusted write share percentage to the second adjusted write share percentage for write accesses to the storage device based on the second count of write accesses, comprises at least one of: (i) adjusting the first adjusted read share percentage to the second adjusted read share percentage for read accesses to the storage device based on a minimum of: the base read share percentage; and the first adjusted read share percentage divided by the control parameter raised to a product of a scaling factor and the second count of write accesses; or (ii) adjusting the first adjusted write share percentage to the second adjusted write share percentage for write accesses to the storage device based on the minimum of: the base read share percentage; and the first adjusted read share percentage divided by the control parameter raised to a product of the scaling factor and the second count of write accesses. In some of these embodiments, the at least one hardware processor is further collectively configured to at least determine that the initial write share percentage equals the base write share percentage. In some of these embodiments, the at least one hardware processor is further collectively configured to at least determine an adjusted worker write share percentage as a base worker write share percentage multiplied by the adjusted write share percentage divided by the base write share percentage. In some of these embodiments, the at least one hardware processor is further collectively configured to at least determine an adjusted worker read share percentage as a base worker read share percentage multiplied by the adjusted read share percentage divided by the base read share percentage.

In some embodiments, methods for recovering worker shares from read prioritization are provided, the methods comprising: determining using at least one hardware processor that read accesses to a storage device are being prioritized over write accesses to the storage device; while read accesses to the storage device are being prioritized over write accesses to the storage device: determining a first count of read accesses to the storage device; performing a first adjusting of at least one of: (i) a base read share percentage to a first adjusted read share percentage for read accesses to the storage device based on the first count of read accesses; or (ii) a base write share percentage to a first adjusted write share percentage for write accesses to the storage device based on the first count of read accesses; and controlling read access to the storage device based on the first adjusting; determining that read accesses to the storage device have completed being prioritized over write accesses to the storage device; and after read accesses to the storage device have completed being prioritized over write accesses to the storage device: determining a second count of write accesses to the storage device; performing a second adjusting of at least one of: (i) the first adjusted read share percentage to a second adjusted read share percentage for read accesses to the storage device based on the second count of write accesses; or (ii) the first adjusted write share percentage to a second adjusted write share percentage for write accesses to the storage device based on the second count of write accesses; and controlling write access to the storage device based on the second adjusting. In some of these embodiments, the first adjusting of the at least one of: (i) the base read share percentage to the first adjusted read share percentage for read accesses to the storage device based on the first count of read accesses; or (ii) the base write share percentage to the first adjusted write share percentage for write accesses to the storage device based on the first count of read accesses, comprises at least one of: (i) adjusting the base read share percentage to the first adjusted read share percentage for read accesses to the storage device based on a control parameter raised to the power of the first count of read accesses; or (ii) adjusting the base write share percentage to the first adjusted write share percentage for write accesses to the storage device based on the control parameter raised to the power of the first count of read accesses. In some of these embodiments, the second adjusting of the at least one of: (i) the first adjusted read share percentage to the second adjusted read share percentage for read accesses to the storage device based on the second count of write accesses; or (ii) the first adjusted write share percentage to the second adjusted write share percentage for write accesses to the storage device based on the second count of write accesses, comprises at least one of: (i)

adjusting the first adjusted read share percentage to the second adjusted read share percentage for read accesses to the storage device based on a control parameter raised to a product of a scaling factor and the second count of write accesses; or (ii) adjusting the first adjusted write share percentage to the second adjusted write share percentage for write accesses to the storage device based on the control parameter raised to the product of the scaling factor and the second count of write accesses. In some of these embodiments, the second adjusting of the at least one of: (i) the first adjusted read share percentage to the second adjusted read share percentage for read accesses to the storage device based on the second count of write accesses; or (ii) the first adjusted write share percentage to the second adjusted write share percentage for write accesses to the storage device based on the second count of write accesses, comprises at least one of: (i) adjusting the first adjusted read share percentage to the second adjusted read share percentage for read accesses to the storage device based on a minimum of: the base read share percentage; and the first adjusted read share percentage divided by the control parameter raised to a product of a scaling factor and the second count of write accesses; or (ii) adjusting the first adjusted write share percentage to the second adjusted write share percentage for write accesses to the storage device based on the minimum of: the base read share percentage; and the first adjusted read share percentage divided by the control parameter raised to a product of the scaling factor and the second count of write accesses. In some of these embodiments, the method further comprises determining that the initial write share percentage equals the base write share percentage. In some of these embodiments, the method further comprises determining an adjusted worker write share percentage as a base worker write share percentage multiplied by the adjusted write share percentage divided by the base write share percentage. In some of these embodiments, the method further comprises determining an adjusted worker read share percentage as a base worker read share percentage multiplied by the adjusted read share percentage divided by the base read share percentage.

In some embodiments, non-transitory computer-readable media containing computer executable instructions that, when executed by a processor, cause the processor to perform a method for recovering worker shares from read prioritization are provided, the method comprising: determining that read accesses to a storage device are being prioritized over write accesses to the storage device; while read accesses to the storage device are being prioritized over write accesses to the storage device: determining a first count of read accesses to the storage device; performing a first adjusting of at least one of: (i) a base read share percentage to a first adjusted read share percentage for read accesses to the storage device based on the first count of read accesses; or (ii) a base write share percentage to a first adjusted write share percentage for write accesses to the storage device based on the first count of read accesses; and controlling read access to the storage device based on the first adjusting; determining that read accesses to the storage device have completed being prioritized over write accesses to the storage device; and after read accesses to the storage device have completed being prioritized over write accesses to the storage device: determining a second count of write accesses to the storage device; performing a second adjusting of at least one of: (i) the first adjusted read share percentage to a second adjusted read share percentage for read accesses to the storage device based on the second count of write accesses; or (ii) the first adjusted write share percentage to a second adjusted write share percentage for write accesses to the storage device based on the second count of write accesses; and controlling write access to the storage device based on the second adjusting. In some of these embodiments, the first adjusting of the at least one of: (i) the base read share percentage to the first adjusted read share percentage for read accesses to the storage device based on the first count of read accesses; or (ii) the base write share percentage to the first adjusted write share percentage for write accesses to the storage device based on the first count of read accesses, comprises at least one of: (i) adjusting the base read share percentage to the first adjusted read share percentage for read accesses to the storage device based on a control parameter raised to the power of the first count of read accesses; or (ii) adjusting the base write share percentage to the first adjusted write share percentage for write accesses to the storage device based on the control parameter raised to the power of the first count of read accesses. In some of these embodiments, the second adjusting of the at least one of: (i) the first adjusted read share percentage to the second adjusted read share percentage for read accesses to the storage device based on the second count of write accesses; or (ii) the first adjusted write share percentage to the second adjusted write share percentage for write accesses to the storage device based on the second count of write accesses, comprises at least one of: (i) adjusting the first adjusted read share percentage to the second adjusted read share percentage for read accesses to the storage device based on a control parameter raised to a product of a scaling factor and the second count of write accesses; or (ii) adjusting the first adjusted write share percentage to the second adjusted write share percentage for write accesses to the storage device based on the control parameter raised to the product of the scaling factor and the second count of write accesses. In some of these embodiments, the second adjusting of the at least one of: (i) the first adjusted read share percentage to the second adjusted read share percentage for read accesses to the storage device based on the second count of write accesses; or (ii) the first adjusted write share percentage to the second adjusted write share percentage for write accesses to the storage device based on the second count of write accesses, comprises at least one of: (i) adjusting the first adjusted read share percentage to the second adjusted read share percentage for read accesses to the storage device based on a minimum of: the base read share percentage; and the first adjusted read share percentage divided by the control parameter raised to a product of a scaling factor and the second count of write accesses; or (ii) adjusting the first adjusted write share percentage to the second adjusted write share percentage for write accesses to the storage device based on the minimum of: the base read share percentage; and the first adjusted read share percentage divided by the control parameter raised to a product of the scaling factor and the second count of write accesses. In some of these embodiments, the method further comprises determining that the initial write share percentage equals the base write share percentage. In some of these embodiments, the method further comprises determining an adjusted worker write share percentage as a base worker write share percentage multiplied by the adjusted write share percentage divided by the base write share percentage. In some of these embodiments, the method further comprises determining an adjusted worker read share percentage as a base worker read share percentage multiplied by the adjusted read share percentage divided by the base read share percentage.

DETAILED DESCRIPTION

Figure 1:
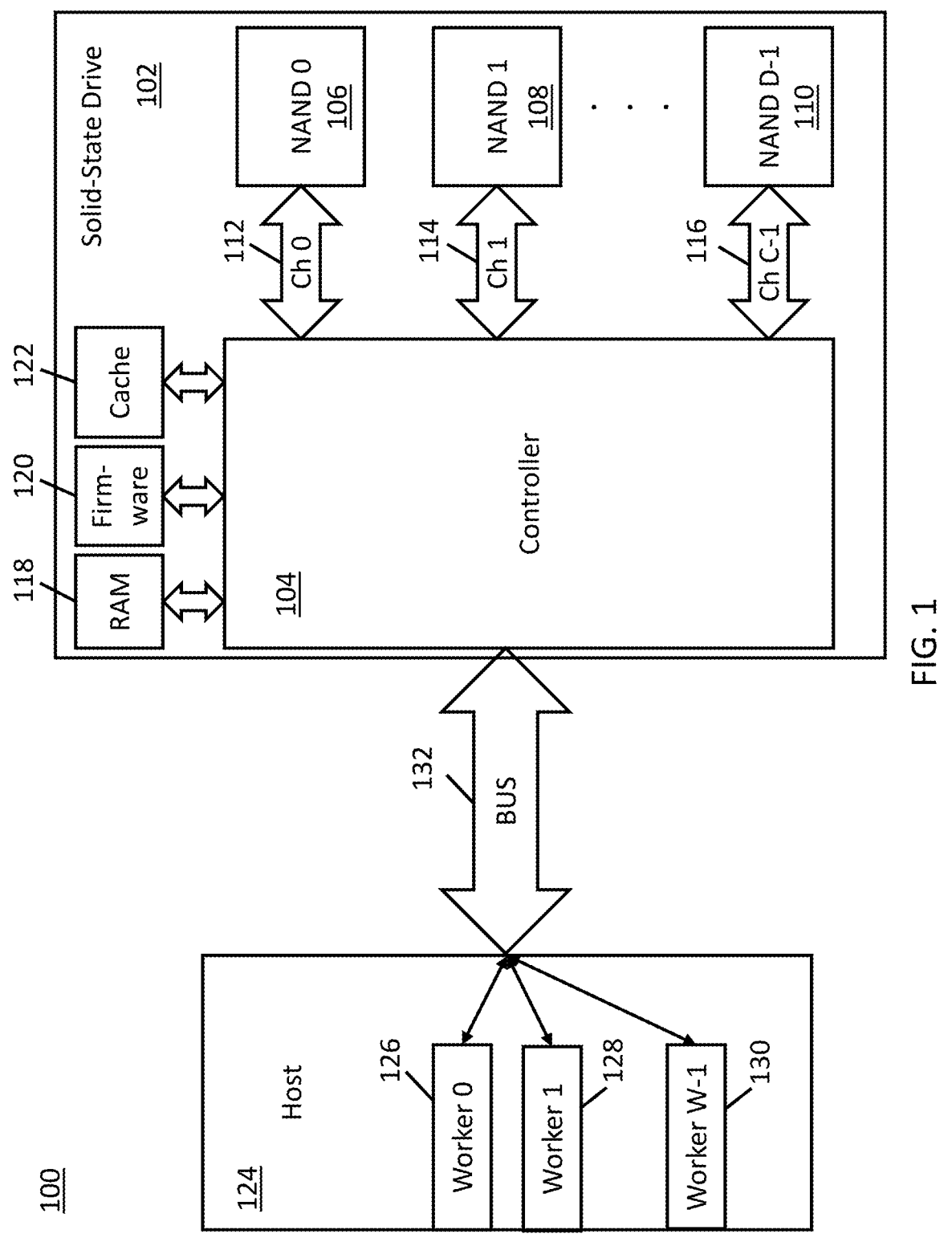
FIG. 1 is an example of block diagram of a solid-state drive coupled to a host device via a bus in accordance with some embodiments.

In accordance with some embodiments, mechanisms (which can include systems, methods, and media) for recovering worker shares from read prioritization are provided.

As described herein, in some embodiments, these mechanisms can adjust worker shares to any suitable part or whole (the part or whole being referred to herein as a "portion") of any suitable one or more storage devices. For example, in a NAND solid state drive (SSD), there may be multiple NAND dies (which may each be referred to herein as a "NAND") and one or more, or all, of these NAND dies may be referred to herein as a portion of the NAND SSD, in some embodiments. Likewise, when multiple SSDs are being used, a portion of the SSDs could be one, two, any suitable subset, or all of the SSDs.

In some embodiments, the mechanisms can be triggered by a read-prioritization trigger indicating that read commands to a portion i of a storage device are being prioritized. In some embodiments, after initializing a count of read commands processed during read prioritization to zero, during read prioritization, the mechanisms can repeatedly: select and process a read command based on a read prioritization process; increment the count of read commands processed; update adjusted read and write share values for portion i of the storage device based on a product of a base read share value and a control parameter raised to the value of the count of read commands processed; and determine if read commands are still being prioritized.

Once read prioritization has completed, in some embodiments, the mechanisms can set a final read share value for portion i of the storage device during read prioritization to the most recent adjusted read share value for portion i of the storage device during read prioritization, and initialize a count of write commands processed during recovering from read prioritization to zero.

Next, in some embodiments, during recovering from read prioritization, the mechanisms can repeatedly: select and process a command based on a non-read-prioritization process; determine if a write command was selected; and if a write command was selected: increment the count of write commands; update adjusted read and write share values for portion i of the storage device based on a minimum of: the base read share value; and a quotient of the final read share value and the control value raised to the power of a product of a scaling factor and the count of write commands; and determine if the adjusted read share value equals a base read share value. When the adjusted read share value equals the base read share value, the mechanism can end.

Through this process, during read prioritization, the adjusted read share values will progressively decrease, and the adjusted write share value will progressively increase, as more read commands are processed for portion i of the storage device. Then, while recovering from read prioritization, the adjusted read share values will progressively increase, and the adjusted write share value will progressively decrease, back to their base values as more write commands are processed for portion i of the storage device.

Turning to FIG. 1, an example block diagram of a solid-state drive 102 coupled to a host device 124 via a bus 132 in accordance with some embodiments is illustrated.

As shown, solid-state drive 102 can include a controller 104, NAND devices 106, 108, and 110, channels 112, 114, and 116, random access memory (RAM) 118, firmware 120, and cache 122 in some embodiments. In some embodiments, more or fewer components than shown in FIG. 1 can be included. In some embodiments, two or more components shown in FIG. 1 can be included in one component.

Controller 104 can be any suitable controller for a solid-state drive in some embodiments. In some embodiments, controller 104 can include any suitable hardware processor(s) (such as a microprocessor, a digital signal processor, a microcontroller, a programmable gate array, etc.). In some embodiments, controller 104 can also include any suitable memory (such as RAM, firmware, cache, buffers, latches, etc.), interface controller(s), interface logic, drivers, etc.

NAND devices 106, 108, and 110 can be any suitable NAND devices for storing information (which can include data, programs, and/or any other suitable information that can be stored in a solid-state drive) in some embodiments. The NAND devices can include any suitable memory cells, hardware processor(s) (such as a microprocessor, a digital signal processor, a microcontroller, a programmable gate array, etc.), interface controller(s), interface logic, drivers, etc. in some embodiments. While three NAND devices (106, 108, and 110) are shown in FIG. 1, any suitable number D of NAND devices (including only one) can be used in some embodiments. Any suitable type of NAND devices (such as single-level cell (SLC), multilevel cell (MLC), triple-level cell (TLC), quad-level cell (QLC), 3D NAND, etc.) can be used in some embodiments. Each NAND device can have any suitable size in some embodiments. While devices 106, 108, and 110 are described herein as being NAND devices, the devices can additionally or alternatively use any other suitable storage technology or technologies, such as NOR flash memory or any other suitable flash technology, phase change memory technology, and/or other any other suitable non-volatile memory storage technology.

Channels 112, 114, and 116 can be any suitable mechanism for communicating information between controller 104 and NAND device 106, 108, and 110 in some embodiments. For example, the channels can be implemented using conductors (lands) on a circuit board in some embodiments. While three channels (112, 114, and 116) are shown in FIG. 1, any suitable number C of channels can be used in some embodiments.

Random access memory (RAM) 118 can include any suitable type of RAM, such as dynamic RAM, static RAM, etc., in some embodiments. Any suitable number of RAM 118 can be included, and each RAM 118 can have any suitable size, in some embodiments.

Firmware 120 can include any suitable combination of software and hardware in some embodiments. For example, firmware 120 can include software programmed in any suitable programmable read only memory (PROM) in some embodiments. Any suitable number of firmware 120, each having any suitable size, can be used in some embodiments.

Cache 122 can be any suitable device for temporarily storing information (which can include data and programs in some embodiments), in some embodiments. Cache 122 can be implemented using any suitable type of device, such as RAM (e.g., static RAM, dynamic RAM, etc.) in some embodiments. Any suitable number of cache 122, each having any suitable size, can be used in some embodiments.

Host device 124 can be any suitable device that accesses stored information in some embodiments. For example, in some embodiment, host device 124 can be a general-purpose computer, a special-purpose computer, a desktop computer, a laptop computer, a tablet computer, a server, a database, a router, a gateway, a switch, a mobile phone, a communication device, an entertainment system (e.g., an automobile entertainment system, a television, a set-top box, a music player, etc.), a navigation system, etc. While only one host device 124 is shown in FIG. 1, any suitable number of host devices can be included in some embodiments.

In some embodiments, host device 124 can include workers 126, 128, and 130. While three workers (126, 128, and 130) are shown in FIG. 1, any suitable number of workers W can be included in some embodiments. In some embodiments, at least two workers can be included. A worker can be any suitable hardware and/or software that reads and/or writes data from and/or to solid-state drive 102.

Bus 132 can be any suitable bus for communicating information (which can include data and/or programs in some embodiments), in some embodiments. For example, in some embodiments, bus 132 can be a PCIE bus, a SATA bus, or any other suitable bus.

Although FIG. 1 illustrates a NAND solid-state drive, it should be understood that the mechanisms described herein can be used with other forms of storage and/or other devices. For example, in some embodiments, the mechanisms can be used with network nodes in routing, compute nodes, and/or any suitable device to which multiple workers require access, and their access is controlled by shares that are determined with a QoS bypass mechanism.

Figure 2:
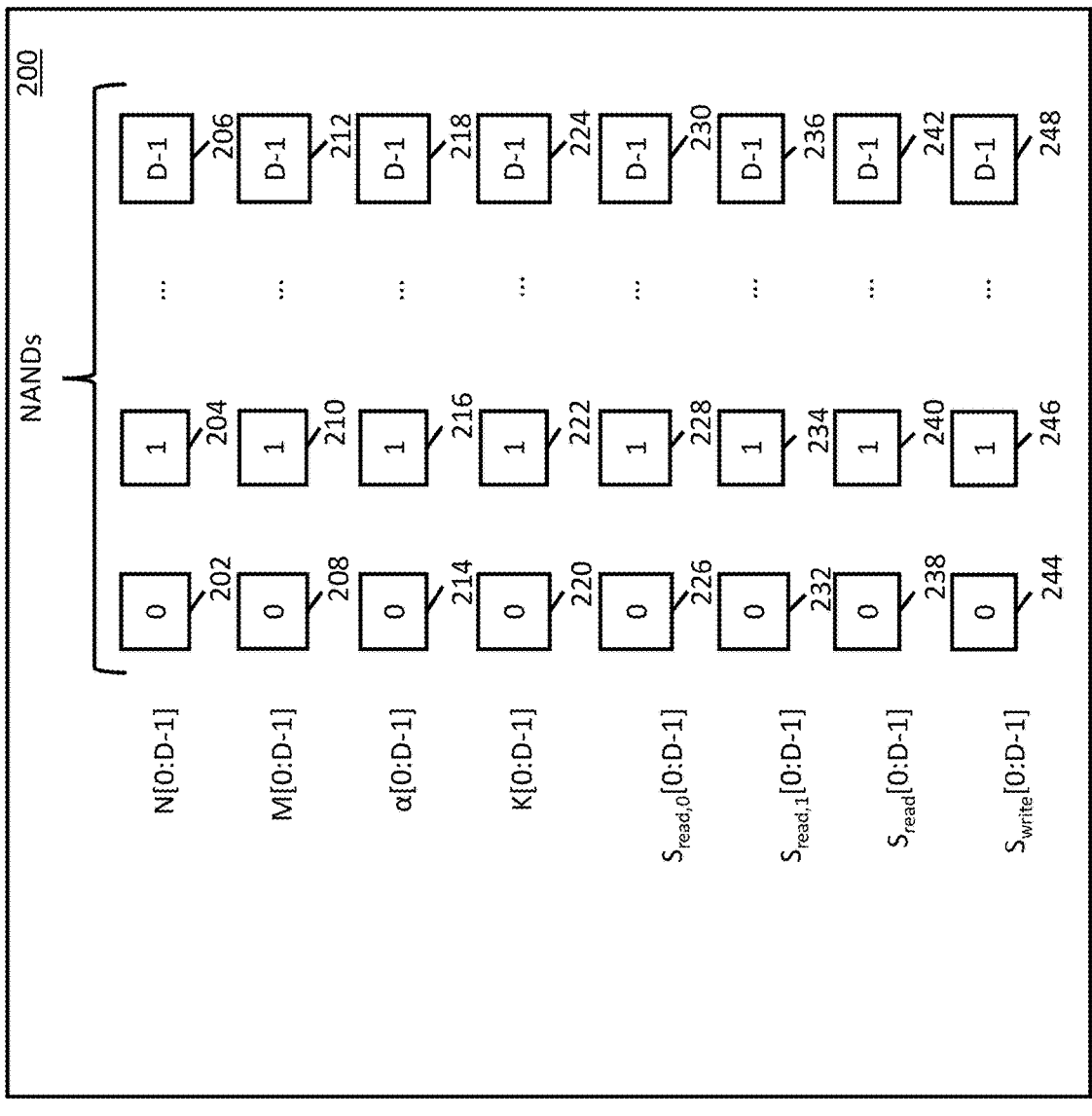
FIG. 2 is an example of values that can be tracked in accordance with some embodiments.

Turning to FIG. 2, examples of values 200 that can be tracked in accordance with some embodiments are illustrated. As shown, these values can include counts of read commands processed during read prioritization $N[0:D-1]$ 202, 204, and 206, counts of write commands processed during recovery from read prioritization $M[0:D-1]$ 208, 210, and 212, control parameters $\alpha[0:D-1]$ 214, 216, and 218, scaling factors $K[0:D-1]$ 220, 222, and 224, initial read share values $S_{read,0}[0:D-1]$ 226, 228, and 230, final read share values $S_{read,1}[0:D-1]$ 232, 234, and 236, adjusted read share values $S_{read}[0:D-1]$ 238, 240, and 242, and adjusted write share values $S_{write}[0:D-1]$ 244, 246, and 248.

Although three of each of $N[0:D-1]$ 202, 204, and 206, $M[0:D-1]$ 208, 210, and 212, $\alpha[0:D-1]$ 214, 216, and 218, $K[0:D-1]$ 220, 222, and 224, $S_{read,0}[0:D-1]$ 226, 228, and 230, $S_{read,1}[0:D-1]$ 232, 234, and 236, $S_{read}[0:D-1]$ 238, 240, and 242, and $S_{write}[0:D-1]$ are illustrated in FIG. 2, any suitable number of these values (including only one) can be tracked in some embodiments. For example, as illustrated, one of each of the above-listed values for each portion of the storage device (e.g., each NAND in the solid-state drive of FIG. 1) can be tracked, in some embodiments.

The values in FIG. 2 can be stored in any suitable location in some embodiments. For example, in some embodiments, these values can be stored in RAM 118 of FIG. 1.

Figure 3:
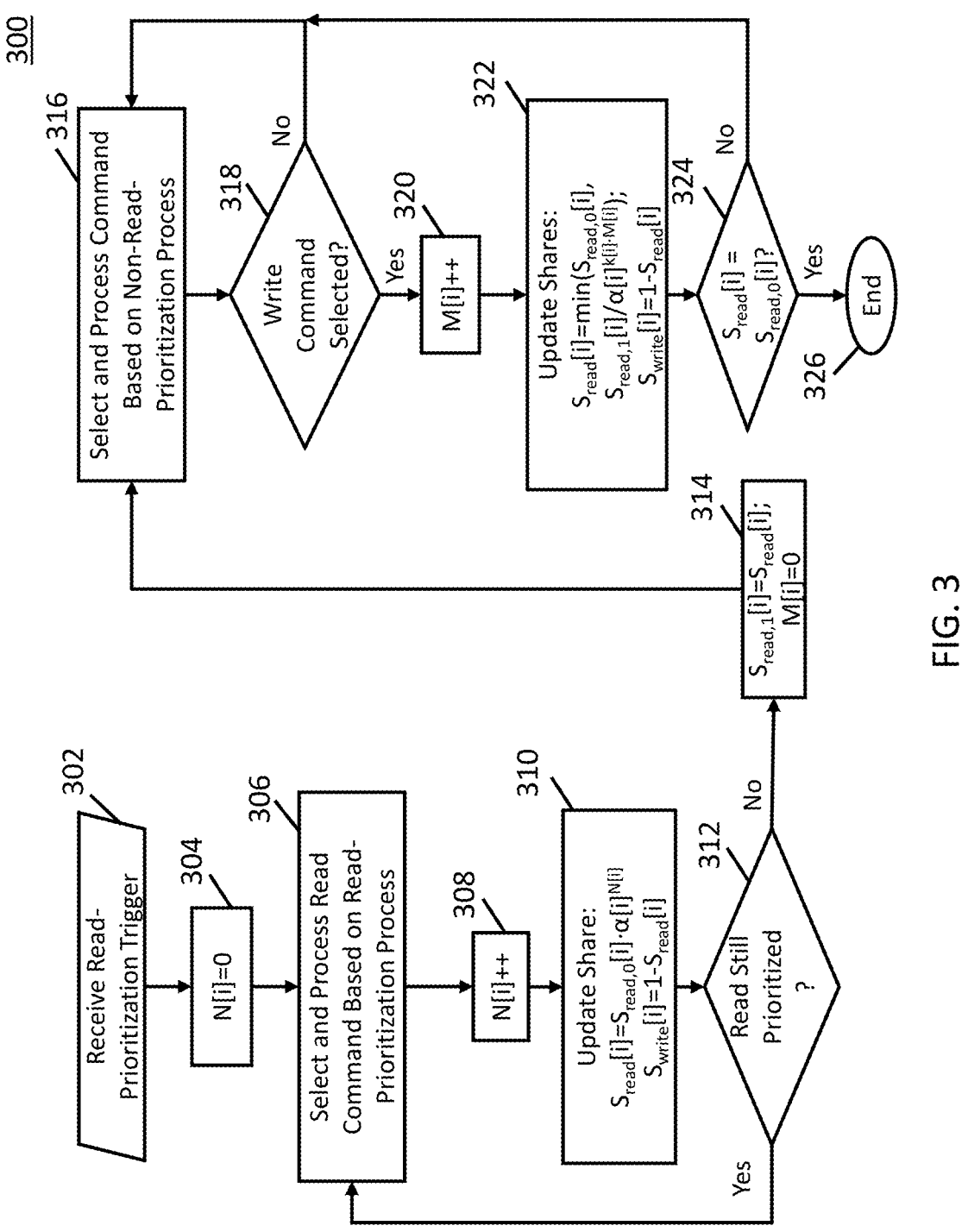
FIG. 3 is an example of a process for recovering worker shares from read prioritization in accordance with some embodiments.

Turning to FIG. 3, an example 300 of a process for recovering worker shares from read prioritization in accordance with some embodiments is shown. This process can be performed on any suitable device. For example, in some embodiments, this process can be performed on a controller of a storage device (e.g., such as controller 104 of FIG. 1). In accordance with some embodiments, a different instance of this process can be executed for each portion i of a storage device (e.g., each NAND device 106, 108, and 110 on solid-state drive 102).

As shown, process 300 can begin at 302 in response to receiving a read-prioritization trigger. This trigger can indicate that read commands for a portion i of a storage device are being prioritized over write commands for the portion i of the storage device. The trigger can be received in any suitable manner from any suitable source, in some embodiments. For example, in some embodiments, the trigger can be received as a flag (e.g., a bit in a shared register) that is set by a process for monitoring QoS in controller 104 when a QoS for the portion i of the storage device drops below a threshold.

Then, at 304, process 300 can initialize N[i] to zero. This initialization can be performed in any suitable manner in some embodiments. For example, in some embodiments, this initialization can be performed by setting a memory location corresponding to N[i] to zero.

Blocks 306, 308, 310, and 312, described below, can be performed during read prioritization in some embodiments.

Next, at 306, the process can select and process a read command based on a read prioritization process. Selecting and processing a read command can be performed in any suitable manner and be based on any suitable read prioritization process, in some embodiments. For example, in some embodiments, selecting and processing a read command can be performed by selecting the oldest read command of a next worker whose share of commands for portion i of the storage device has not yet been met, and then processing that command based on the parameters of the command.

At 308, process 300 can next increment N[i]. N[i] can be incremented at 308 in any suitable manner in some embodiments. For example, in some embodiments, incrementing N[i] can be performed by adding one to the value in a memory location corresponding to N[i].

Then, at 310, process 300 can update share values $S_{read}[i]$ and $S_{write}[i]$ so that the share values for read commands decrease and the share values for write commands increase. This updating of these share values can be performed in any suitable manner. For example, in some embodiments, share values $S_{read}[i]$ and $S_{write}[i]$ can be updated using the following equations:

$$S_{read}[i] = S_{read,0}[i] * \alpha[i]^{N[i]}; \text{ and}$$

$$S_{write}[i] = 1 - S_{read}[i],$$

where:
    $S_{read}[i]$ is the adjusted read share percentage for portion i of a storage device;
    $S_{write}[i]$ is the adjusted write share percentage for portion i of the storage device;
    $S_{read,0}[i]$ is the base read share percentage for portion i of the storage device;
    $\alpha[i]$ is a control parameter for portion i of the storage device and can have any suitable value such as a value greater than zero and less than one; and
    N[i] is the number of read accesses to portion i of the storage device made during read prioritization.

Next, at 312, the process can determine if read commands for portion i of the storage device are still being prioritized. This determination can be made in any suitable manner in some embodiments. For example, in some embodiments, this determination can be made by checking that a flag (e.g., a bit in a shared register) has been cleared by a process for monitoring QoS in controller 104 when a QoS for the portion i of the storage device rises above a threshold.

If process 300 determines that read commands are still being prioritized for portion i of the storage device, the process can loop back to 306.

Otherwise, if process 300 determines that read commands are not still being prioritized for portion i of the storage device, the process can branch to 314 at which it can set the final read share value from read prioritization for portion i of the storage device ($S_{read,1}[i]$) equal to the most-recent value of the adjusted read share value for portion i of the storage device ($S_{read}[i]$) set at 310. Setting the final read share value from read prioritization for portion i of the storage device ($S_{read,1}[i]$) equal to the most-recent value of the adjusted read share value for portion i of the storage device ($S_{read}[i]$) set can be performed in any suitable manner in some embodiments. For example, in some embodiments, setting the final read share value from read prioritization for portion i of the storage device ($S_{read,1}[i]$) equal to the most-recent value of the adjusted read share value for portion i of the storage device ($S_{read}[i]$) set can be performed by setting a memory location corresponding to $S_{read,1}[i]$ equal to the value in a memory location corresponding to $S_{read}[i]$N[i].

At 314, process 300 can also initialize M[i] to zero in some embodiments. This initialization can be performed in any suitable manner in some embodiments. For example, in some embodiments, this initialization can be performed by setting a memory location corresponding to M[i] to zero.

Blocks 316, 318, 320, 322, and 324, described below, can be performed while recovering from read prioritization in some embodiments.

At 316, process 300 can select and process a read or write command based on a non-read-prioritization process. Selecting and processing a read or write command can be performed in any suitable manner and be based on any suitable non-read-prioritization process, in some embodiments. For example, 316 of process 300 can be performed as described below in connection with FIG. 4.

Then at 318, process 300 can determine if a write command was selected at 316. This determination can be made in any suitable manner in some embodiments. For example, in some embodiments, determining if a write command was selected can be performed by inspecting a type of command indicated in a field of the command.

If process 300 determines at 318 that a write command was not selected at 316, then process 300 can loop back to 316.

Otherwise, if process 300 determines at 318 that a write command was selected at 316, then process 300 can branch to 320 at which it can increment M[i]. Process 300 can increment M[i] in any suitable manner in some embodiments. For example, in some embodiments, incrementing N[i] can be performed by adding one to the value in a memory location corresponding to N[i].

Next, at 322, process 300 can update share values $S_{read}[i]$ and $S_{write}[i]$ so that the share values for read commands increase and the share values for write commands decrease. This updating of these share values can be performed in any suitable manner. For example, in some embodiments, share values $S_{read}[i]$ and $S_{write}[i]$ can be updated using the following equations:

$$S_{read}[i] = \min(S_{read,0}[i], S_{read,1}[i]/\alpha[i]^{K[i]*M[i]}); \text{ and}$$

-continued $$S_{write}[i] = 1 - S_{read}[i],$$

where:

$S_{read}[i]$ is the adjusted read share percentage for portion i of a storage device;

$S_{write}[i]$ is the adjusted write share percentage for portion i of the storage device;

$S_{read,0}[i]$ is the base read share percentage for portion i of the storage device;

$S_{read,1}[i]$ is the final read share percentage for portion i of the storage device during read prioritization of portion i of the storage device;

$\alpha[i]$ is a control parameter for portion i of the storage device and can have any suitable value such as a value greater than zero and less than one;

$K[i]$ is a scaling value for portion i of the storage device and can have a value greater than 1; and $M[i]$ is the number of write accesses made to portion i of the storage device while recovering from read prioritization.

Then, at 324, process 300 can determine if the adjusted read share percentage for portion i of a storage device ($S_{read}[i]$) equals the base read share percentage for portion i of the storage device ($S_{read,0}[i]$). This determination can be made in any suitable manner in some embodiments. For example, in some embodiments, this determination can be made by comparing a value in a memory location corresponding to $S_{read}[i]$ to determine if it is equal a value in a memory location corresponding to $S_{read,0}[i]$. If not, process 300 can loop back to 316. Otherwise, process 300 can end at 326.

Figure 4:
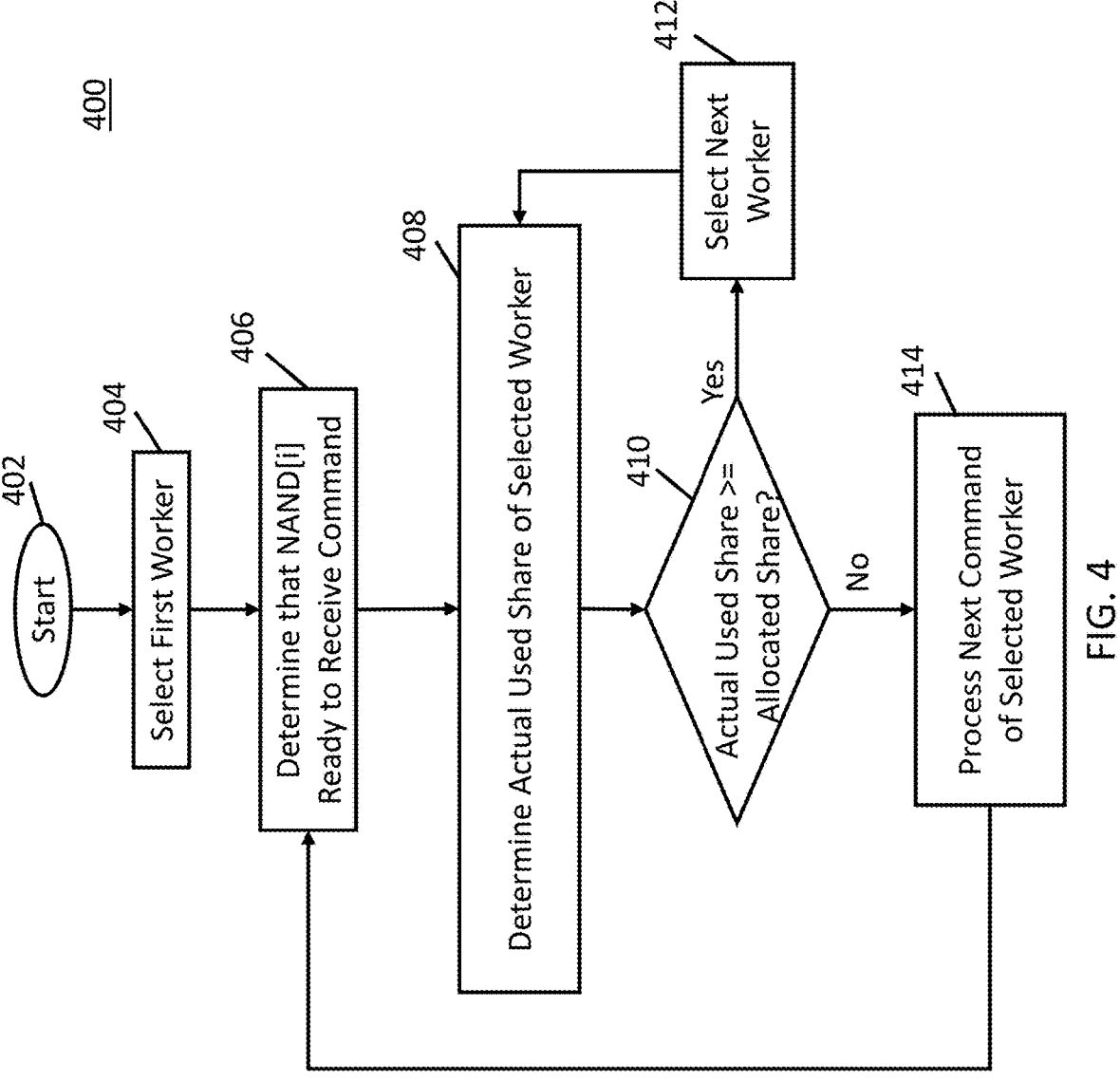
FIG. 4 is an example of a process for selecting and processing a command based on a non-read prioritization process in accordance with some embodiments.

Turning to FIG. 4, an example 400 of a process for deciding which command is to proceed to a portion i of a storage device (illustrated here as NAND[i]) that can be used at 316 of FIG. 3 in accordance with some embodiments is shown. This process can be performed on any suitable device. For example, in some embodiments, this process can be performed on a controller of a storage device (e.g., such as controller 104 of FIG. 1).

As illustrated, after process 400 begins at 402, the process can select a first worker. Any suitable worker can be selected as the first worker and this worker can be selected in any suitable manner, in some embodiments. For example, in some embodiments, the worker with oldest incomplete command can be selected as the first worker. As another example, a worker that was first instantiated can be selected as the first worker in some embodiments.

Next, at 406, process 400 can determine that NAND[i] is ready to receive a command. This determination can be made in any suitable manner in some embodiments. For example, in some embodiments, this determination can be made by checking a command queue of NAND[i] to see if it is empty (which can indicate that NAND[i] is ready to receive a command).

Then, at 408, process 400 can determine an actual used share of the selected worker. This determination can be made in any suitable manner in some embodiments. For example, in some embodiments, process 400 can determine an actual used share of the selected worker by dividing the total worker time on NAND[i] by the total time of all workers on NAND[i].

At 410, process 400 can next determine if the actual used share of the selected worker meets (e.g., is greater than, or greater than or equal to) the allocated share of the selected worker for the corresponding NAND[i]. This determination can be made in any suitable manner in some embodiments. For example, in some embodiments, process 400 can make this determination by comparing a first value in a memory location corresponding to the actual used share of the selected worker to a second value in a memory location corresponding to the allocated share of the selected worker for the corresponding NAND[i] to determine if the first value is greater than, or greater than or equal to, the second value.

If it is determined at 410 that the actual used share of the selected worker meets (e.g., is greater than, or greater than or equal to) the allocated share of the selected worker for the corresponding NAND[i], then process 400 can select a next worker at 412. The next worker can be selected in any suitable manner. For example, in some embodiments, the worker with next oldest incomplete command compared to the currently selected worker can be selected as the next worker. As another example, a worker that was instantiated next after the currently selected worker can be selected as the first worker in some embodiments. After selecting the next worker at 412, process 400 can loop back to 408.

Otherwise, if it is determined at 410 that the actual used share of the selected worker does not meet (e.g., is less than, or less than or equal to) the allocated share of the selected worker for the corresponding NAND[i], then process 400 can process the next command of the selected worker at 414 and then loop back to 406. Process 400 can process the next command of the selected worker in any suitable manner in some embodiments. For example, in some embodiments, the process can process a command of the selected worker that is next in a command queue based on the parameters of the command.

In some embodiments, at least some of the above-described blocks of the processes of FIGS. 3 and 4 can be executed or performed in any order or sequence not limited to the order and sequence shown in and described in connection with the figures. Also, some of the above blocks of the processes of FIGS. 3 and 4 can be executed or performed substantially simultaneously where appropriate or in parallel to reduce latency and processing times in some embodiments. Additionally or alternatively, some of the above described blocks of the processes of FIGS. 3 and 4 can be omitted in some embodiments.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

As can be seen from the description above, new mechanisms (which can include systems, methods, and media) for recovering worker shares from read prioritization are provided. By recovering worker shares from read prioritization when needed, these mechanisms can improve meeting allocated worker shares for access to storage devices and thereby improve the performance of host devices connected to the storage devices.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for recovering worker shares from read prioritization, comprising:

memory; and at least one hardware processor collectively configured to at least:

determine that read accesses to a storage device are being prioritized over write accesses to the storage device;

while read accesses to the storage device are being prioritized over write accesses to the storage device:

determine a first count of read accesses to the storage device;

perform a first adjusting of a base read share percentage to a first adjusted read share percentage for read accesses to the storage device based on the first count of read accesses such that the first adjusted read share percentage decreases as the first count of read accesses increases; and control read access to the storage device based on the first adjusting;

determine that read accesses to the storage device have completed being prioritized over write accesses to the storage device; and after read accesses to the storage device have completed being prioritized over write accesses to the storage device:

determine a second count of write accesses to the storage device;

performing a second adjusting of the first adjusted read share percentage to a second adjusted read share percentage for read accesses to the storage device based on the second count of write accesses such that the second adjusted read share percentage increases as the second count of write accesses increases; and control write access to the storage device based on the second adjusting.

2. The system of claim 1, wherein the first adjusting of the base read share percentage to the first adjusted read share percentage for read accesses to the storage device based on the first count of read accesses comprises adjusting the base read share percentage to the first adjusted read share percentage for read accesses to the storage device based on a control parameter raised to the power of the first count of read accesses, wherein the control parameter is a value greater than zero and less than one.

3. The system of claim 1, wherein the second adjusting of the first adjusted read share percentage to the second adjusted read share percentage for read accesses to the storage device based on the second count of write accesses comprises adjusting the first adjusted read share percentage to the second adjusted read share percentage for read accesses to the storage device based on a control parameter raised to a product of a scaling factor and the second count of write accesses, wherein the control parameter is a value greater than zero and less than one and the scaling factor is a value greater than one.

4. The system of claim 1, wherein the second adjusting of the first adjusted read share percentage to the second adjusted read share percentage for read accesses to the storage device based on the second count of write accesses comprises adjusting the first adjusted read share percentage to the second adjusted read share percentage for read accesses to the storage device based on a minimum of: the base read share percentage; and the first adjusted read share percentage divided by a control parameter raised to a product of a scaling factor and the second count of write accesses, wherein the control parameter is a value greater than zero and less than one and the scaling factor is a value greater than one.

5. The system of claim 1, wherein the at least one hardware processor is further collectively configured to at least determine an adjusted worker read share percentage as a base worker read share percentage multiplied by the first adjusted read share percentage divided by the base read share percentage.

6. A method for recovering worker shares from read prioritization, comprising:

determining using at least one hardware processor that read accesses to a storage device are being prioritized over write accesses to the storage device;

while read accesses to the storage device are being prioritized over write accesses to the storage device:

determining a first count of read accesses to the storage device;

performing a first adjusting of a base read share percentage to a first adjusted read share percentage for read accesses to the storage device based on the first count of read accesses such that the first adjusted read share percentage decreases as the first count of read accesses increases; and controlling read access to the storage device based on the first adjusting;

determining that read accesses to the storage device have completed being prioritized over write accesses to the storage device; and after read accesses to the storage device have completed being prioritized over write accesses to the storage device:

determining a second count of write accesses to the storage device;

performing second adjusting of the first adjusted read share percentage to a second adjusted read share percentage for read accesses to the storage device based on the second count of write accesses such that the second adjusted read share percentage increases as the second count of write accesses increases; and controlling write access to the storage device based on the second adjusting.

7. The method of claim 6, wherein the first adjusting of the base read share percentage to the first adjusted read share percentage for read accesses to the storage device based on the first count of read accesses comprises adjusting the base read share percentage to the first adjusted read share percentage for read accesses to the storage device based on a control parameter raised to the power of the first count of read accesses, wherein the control parameter is a value greater than zero and less than one.

8. The method of claim 6, wherein the second adjusting of the first adjusted read share percentage to the second adjusted read share percentage for read accesses to the storage device based on the second count of write accesses comprises adjusting the first adjusted read share percentage to the second adjusted read share percentage for read accesses to the storage device based on a control parameter raised to a product of a scaling factor and the second count of write accesses, wherein the control parameter is a value greater than zero and less than one and the scaling factor is a value greater than one.

9. The method of claim 6, wherein the second adjusting of the first adjusted read share percentage to the second adjusted read share percentage for read accesses to the storage device based on the second count of write accesses comprises adjusting the first adjusted read share percentage to the second adjusted read share percentage for read accesses to the storage device based on a minimum of: the base read share percentage; and the first adjusted read share percentage divided by a control parameter raised to a product of a scaling factor and the second count of write accesses, wherein the control parameter is a value greater than zero and less than one and the scaling factor is a value greater than one.

10. The method of claim 6, further comprising determining an adjusted worker read share percentage as a base worker read share percentage multiplied by the first adjusted read share percentage divided by the base read share percentage.

11. A non-transitory computer-readable medium containing computer executable instructions that, when executed by a processor, cause the processor to perform a method for recovering worker shares from read prioritization, the method comprising:

determining that read accesses to a storage device are being prioritized over write accesses to the storage device;

while read accesses to the storage device are being prioritized over write accesses to the storage device:

determining a first count of read accesses to the storage device;

performing a first adjusting of a base read share percentage to a first adjusted read share percentage for read accesses to the storage device based on the first count of read accesses such that the first adjusted read share percentage decreases as the first count of read accesses increases; and controlling read access to the storage device based on the first adjusting;

determining that read accesses to the storage device have completed being prioritized over write accesses to the storage device; and after read accesses to the storage device have completed being prioritized over write accesses to the storage device:

determining a second count of write accesses to the storage device;

performing a second adjusting of the first adjusted read share percentage to a second adjusted read share percentage for read accesses to the storage device based on the second count of write accesses such that the second adjusted read share percentage increases as the second count of write accesses increases; and controlling write access to the storage device based on the second adjusting.

12. The non-transitory computer-readable medium of claim 11, wherein the first adjusting of the base read share percentage to the first adjusted read share percentage for read accesses to the storage device based on the first count of read accesses comprises adjusting the base read share percentage to the first adjusted read share percentage for read accesses to the storage device based on a control parameter raised to the power of the first count of read accesses, wherein the control parameter is a value greater than zero and less than one.

13. The non-transitory computer-readable medium of claim 11, wherein the second adjusting of the first adjusted read share percentage to the second adjusted read share percentage for read accesses to the storage device based on the second count of write accesses comprises adjusting the first adjusted read share percentage to the second adjusted read share percentage for read accesses to the storage device based on a control parameter raised to a product of a scaling factor and the second count of write accesses, wherein the control parameter is a value greater than zero and less than one and the scaling factor is a value greater than one.

14. The non-transitory computer-readable medium of claim 11, wherein the second adjusting of the first adjusted read share percentage to the second adjusted read share percentage for read accesses to the storage device based on the second count of write accesses comprises adjusting the first adjusted read share percentage to the second adjusted read share percentage for read accesses to the storage device based on a minimum of: the base read share percentage; and the first adjusted read share percentage divided by a control parameter raised to a product of a scaling factor and the second count of write accesses, wherein the control parameter is a value greater than zero and less than one and the scaling factor is a value greater than one.

15. The non-transitory computer-readable medium of claim 11, wherein the method further comprises determining an adjusted worker read share percentage as a base worker read share percentage multiplied by the first adjusted read share percentage divided by the base read share percentage.

\* \* \* \* \*